Figure 1:
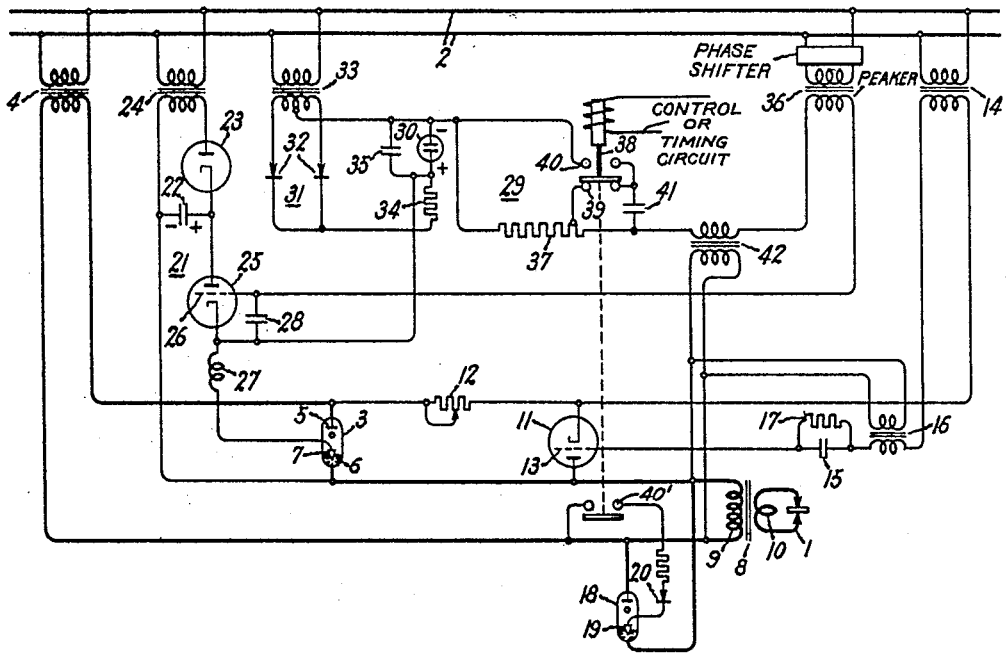

July 27, 1943.　　　G. W. GARMAN　　　2,325,390
ELECTRIC VALVE TRANSLATING SYSTEM
Filed March 30, 1942

Inventor:
George W. Garman,
by Harry E. Dunham
His Attorney.

Patented July 27, 1943

2,325,390

UNITED STATES PATENT OFFICE 2,325,390

ELECTRIC VALVE TRANSLATING SYSTEM

George W. Garman, Glenville, N. Y., assignor to General Electric Company, a corporation of New York Application March 30, 1942, Serial No. 436,791

12 Claims. (Cl. 171—97)

My invention relates to electric valve translating systems and more particularly to arrangements including electric valve apparatus of the type employing ionizable mediums for effecting energization of a load circuit from an alternating current supply circuit.

In many applications, such as welding systems, it is desirable not only to transfer to the welding circuit a current of predetermined magnitude, but it is also important to control the wave shape of the current supplied to the welding circuit in order to obtain the desired quality of weld. In accordance with the teachings of my invention described hereinafter, I provide new and improved translating apparatus which controls the amount of current transmitted to the welding circuit and also controls the wave form of the current transmitted to the welding circuit.

It is an object of my invention to provide new and improved electric valve translating apparatus.

It is another object of my invention to provide new and improved electric valve translating apparatus for energizing a welding circuit.

It is a further object of my invention to provide new and improved electric valve translating apparatus for transmitting an impulse of current to a welding circuit, and wherein the current supplied to the welding circuit has a predetermined wave form.

It is another object of my invention to provide new and improved electric valve welding equipment wherein the duty imposed on the electric valve means is substantially reduced and wherein the efficiency of the translating system as a whole is substantially increased.

It is a still further object of my invention to provide new and improved electric valve welding equipment for energizing a welding circuit, and wherein a given amount of energy may be transmitted to the welding circuit by using equipment of substantially smaller rating and size than that required by the arrangements devised heretofore.

Briefly stated, in the illustrated embodiment of my invention I provide new and improved electric valve welding equipment for transmitting an impulse of current to a welding circuit from an alternating current supply circuit. The impulse of welding current has a wave form which may be generally described as triangular or peaked but in which the current during the latter part of the impulse decays exponentially. This type of wave form has been found important, and in some instances necessary, in the welding of high-strength aluminum alloys where it is desired to prevent cracking or porosity of the weld. More particularly, I connect an electric valve means between an alternating current supply circuit and a welding transformer to render the electric valve means conducting during a positive half cycle of applied anode-cathode voltage to effect the transmission of an impulse of current to the welding circuit. As a means for reducing the size of the welding transformer, immediately prior to the conduction of current by the electric valve means, the welding transformer is premagnetized or presaturated in a direction opposite to the magnetization effected by conduction of current by the electric valve means. In this manner, the current transmitted to the welding circuit is maintained unidirectional and the iron or core structure of the welding transformer is utilized to a greater extent than would be accomplished by merely energizing the transformer from the alternating current supply circuit. As a means for causing the welding current to decay exponentially and to utilize all of the electromagnetic energy stored in the welding transformer and associated conductors, I connect to the welding transformer a second electric valve means poled in a manner to permit the flow of current therethrough incident to the stored electromagnetic energy of the system. This second electric valve means, upon being rendered conducting, lessens the duty imposed on the electric valve means which is connected between the power transformer and the alternating current supply circuit, and consequently limits or substantially reduces the energy loss which would otherwise be dissipated in the system, or returned to the alternating current supply circuit.

My invention relates to an improvement in electric valve circuits of the type disclosed and claimed in United States Letters Patent No. 2,120,565 granted June 14, 1938 upon an application of Harold W. Lord et al. and which is assigned to the assignee of the present application.

Figure 2:
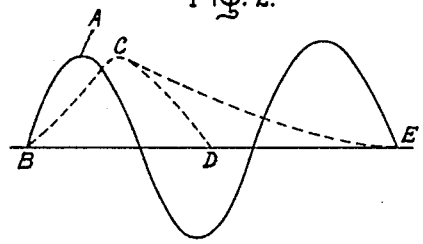

For a better understanding of my invention, reference may be had to the following description taken in connection with the accompanying drawing, and its scope will be pointed out in the appended claims. Fig. 1 diagrammatically illustrates an embodiment of my invention as applied to a welding system, and Fig. 2 represents certain operating characteristics thereof.

Referring now to Fig. 1 of the drawing, I have there illustrated my invention as applied to an electric valve welding system for energizing a welding circuit 1 from an alternating current supply circuit 2 through electric valve means 3 and a transformer 4. The electric valve means 3 is preferably of the type employing an ionizable medium, such as a gas or a vapor, and comprises an anode 5, a cathode 6 and a control means or member 7 which may be of the immersion-igniter type constructed of a material such as boron carbide or silicon carbide having a relatively large electrical resistivity with respect to the mercury of the associated cathode 6. It will be understood that in accordance with my invention I may employ other types of electric valve means such as the types which use ionizable medium capable of supporting an arc discharge.

Transforming means, such as a welding transformer 8, is provided with primary winding means 9 and secondary winding means 10, the latter of which is connected to the welding circuit 1. The primary winding means 9 is energized at predetermined times from the alternating current supply circut 2 through transformer 4 and the electric valve means 3.

I employ means for premagnetizing or presaturating the core member of the transforming means 8 immediately prior to each energization of the primary winding means 9 by the electric valve means 3. The premagnetizatiion or presaturation is in a direction opposite to the magnetization effected by the conduction of current by electric valve means 3. This means for effecting the premagnetization or the presaturation may comprise an electric valve 11 which is oppositely poled with respect to the electric valve means 3 and may be connected reversely across the electric valve means 3 in series relation with a resistance 12. The electric valve 11 is of substantially lower rating than electric valve means 3, and the magnitude of the current transmitted to the primary winding means 3 during the premagnetizing or presaturating period may be determined or adjusted by the resistance 12. The electric valve 11 may comprise a control means or member, such as a grid 13, which is energized to render the electric valve 11 conducting during each half cycle of current immediately preceding the half cycles of conduction by the electric valve means 3. In other words, the electric valve 11 conducts current during the negative half cycles of the voltage of circuit 2. This selective control of the conductivity of the electric valve 11 may be obtained by means of a transformer 14 which is energized from supply circuit 2.

As a means for maintaining the electric valve 11 nonconducting for a predetermined interval of time after conduction of current by the electric valve means 3, I employ a capacitance 15 which is charged in response to the energization of the transforming means 8 or the welding circuit. This means may comprise a transformer 16 which is energized in response to the voltage appearing across the primary winding means 9. The time during which the electric valve 11 is maintained nonconducting by virtue of the negative unidirectional biasing potential produced across capacitance 15 is determined by means of a discharge circuit for the capacitance 15 and which may comprise a resistance 17.

In order to cause the current transmitted to the welding circuit 1 to decay exponentially at a predetermined rate, I provide a unidirectional conducting means, such as an electric valve means 18 connected to the transforming means 8. The electric valve means 18 may be connected across the primary winding means 9 and is poled in a direction to provide a circulating path for the flow of current incident to the electromagnetic energy stored in the transforming means 8 due to the conduction of current by the electric valve means 3. The electric valve means 18 may be of the type comprising an ionizable medium, such as a gas or a vapor, and also may comprise an immersion-igniter type control member 19 which is energized in response to the anode voltage. If such an arrangement is used, the control member 19 may be energized through a unidirectional conducting device 20 and apparatus described hereinafter. It is to be understood that the electric valve means 18 may be rendered conducting at predetermined times during the cycle of operation by a circuit similar to the one which is described hereinafter for effecting the energization of the control member 7 of electric valve means 3.

I employ an excitation circuit 21 for rendering the electric valve means 3 conducting. The excitation circuit 21 comprises a capacitance 22 which is charged to the polarity indicated by any suitable rectifier which may comprise a unidirectional conducting device 23 energized from the supply circuit 2 through a transformer 24. At predetermined times established by the timing circuit described hereinafter, the capacitance 22 is discharged to energize the immersion-igniter control member 7. The discharge circuit for capacitance 22 may comprise an electric discharge device 25 provided with a control member or grid 26. If the electric discharge device 25 is of the type employing an ionizable medium such as a gas or a vapor, an inductance 27 may be connected in series relation with the discharge device 25 in order to limit the current transmitted to control member 7. A capacitance 28 is connected across the grid and cathode of electric discharge device 25 and cooperates with a control circuit described hereinafter in the control of the conductivity of the discharge device 25.

A control circuit 29 is provided for rendering the electric discharge device 25 conducting and consequently for rendering the electric valve means 3 conducting at predetermined times in response to a circuit controlling operation and for preventing operation of these devices for a predetermined interval of time after each operation. The control circuit 29 comprises a source of negative unidirectional biasing potential which is impressed on the grid 26 of discharge device 25, thereby normally tending to maintain the discharge device 25 nonconducting. This biasing potential may be obtained by means of a glow discharge valve 30 which is energized from a rectifier 31. The rectifier 31 may comprise a pair of unidirectional conducting devices 32 and a transformer 33. Glow discharge valve 30 constitutes a part of a voltage divider including resistances 34. These two elements are connected in series relation across the output circuit of the rectifier 31. A capacitance 35 may be connected in parallel with the glow discharge valve 30.

In order to render the electric discharge device 25 conducting at predetermined times, I provide suitable means, such as a peaking transformer 36, which is connected in circuit with grid 26 of discharge device 25 through a resistance 37. The magnitude of the resistance 37 is chosen so that normally the voltage produced by peaking transformer 36 is insufficient to render the electric discharge device 25 conducting.

I provide a circuit controlling means, such as a relay 38, which is energized in response to a predetermined circuit controlling operation to increase the effectiveness of the peaking transformer 36 and thereby render the electric discharge device 25 conductive. This operation may be accomplished by providing the relay 38 with contacts 39 and 40 the former of which connects a capacitance 41 in a shunt circuit across the resistance 37, thereby permitting the flow of substantial current to the capacitance 28 and effecting a transient increase in the positive direction of the voltage impressed on grid 26 of discharge device 25. Contacts 39 when in the closed circuit position effectively shunt the capacitance 41 through a portion of resistance 37.

Relay 38 may be connected to a control or timing circuit so that the relay operates once in response to a single circuit controlling operation, or so that relay 38 operates intermittently thereby effecting either a single energization of the welding circuit 1, or intermittent or periodic energization thereof.

I provide means for selectively controlling the conductivity of the electric valve means 18 to prevent conduction thereby when the electric valve 11 premagnetizes the transforming means 8 and for rendering the electric valve means 18 conducting, or placing it in condition for conduction, during the interval when the primary winding means 9 is energized by electric valve means 3. Relay 38 may be provided with contacts 40' which are connected in series relation between the anode of electric valve means 18 and the control member 19 through the unidirectional conducting device 20 so that energizing current is transmitted to the control member 19 as soon as the voltage of the primary winding means 9 tends to reverse polarity, and to provide a path for the flow of circulating current incident to the electromagnetic energy stored in the transforming means 8.

In order to prevent operation of the electric valve means 3 during a predetermined interval of time after each period of conduction of current thereby, I employ means for maintaining the electric discharge device 25 nonconducting for a corresponding interval. This means may comprise a transformer 42 which is energized in response to the energization of the transforming means 8 and is shown as being connected across the primary winding means 9.

The operation of the embodiment of my invention shown in Fig. 1 will be explained by considering the system when it is desired to effect the transmission of a single impulse of current to the welding circuit 1 in response to the operation of relay 38, when the relay 38 is operated once in response to a circuit controlling operation. Prior to the operation of relay 38, the electric valve means 3, which is normally nonconducting, is not energized by the excitation circuit 21. The electric valve means 11 conducts current from the supply circuit through transformer 14 to the primary winding means 9 and premagnetizes or presaturates the core member of the transforming means 8. Electric valve 11 conducts current during the negative half cycles of the voltage of the supply circuit 2. Of course, the electric valve means 18 is nonconducting at this time. Electric valve means 18 is prevented from conducting current during the negative half cycles of voltage of supply circuit 2 by virtue of the fact that contacts 40' of relay 38 are open, thereby preventing the transmission of energizing current to control member 19.

Upon operation of the relay 38, contacts 39 thereof are opened and contacts 40 are closed, thereby effectively shunting the resistance 37 through capacitance 41 and causing the appearance across capacitance 28 of a voltage sufficiently positive to render the electric discharge device 25 conducting. The voltage which produces conduction by the electric discharge device 25 is produced by the peaking transformer 36. Upon being rendered conducting, the discharge device 25 discharges capacitance 22 and effects the transmission of a unidirectional impulse of current to control member 7 of electric valve means 3. As a consequence electric valve means 3 transmits current to the primary winding means 9 of the transforming means 8. The electric discharge device 25 is prevented from subsequent operation by virtue of the charge which is established on capacitance 41 through the energization of the transformer 42 which is energized in response to the current flowing through the primary winding means 9. That is, capacitance 41 produces a negative unidirectional biasing potential of a magnitude sufficient to maintain the discharge device 25 nonconducting until relay 38 is deenergized. In like manner, the electric valve 11 is prevented from conducting current during a predetermined time after the conduction of current by electric valve means 3 by virtue of transformer 16 and capacitance 15 which impresses a negative biasing voltage on grid 13 of electric valve 11.

Upon operation of relay 38, the electric valve means 18 is preconditioned by virtue of closure of contacts 40' which connect control member 19 to the anode, or to one terminal of the primary winding means 9.

The electric valve means 18 begins to conduct current when the voltage appearing across the terminals of the primary winding means 9 tends to reverse, thereby providing a circulating path for the flow of current incident to the electromagnetic energy stored in the transforming means 8. By virtue of this operation substantially all of the stored electromagnetic energy is effectively utilized in the welding circuit 1 by causing the transfer of this energy to the welding circuit. By so conducting, the electric valve means 18 causes the welding current to decay exponentially and consequently produces that type of current wave form which is desirable in the welding of high-strength alloys such as aluminum alloys.

Another important advantage of a system constructed in accordance with my invention is the fact that the electric valve means 18 reduces the period of conduction of the electric valve means 3 and consequently relieves the duty imposed thereon. A still further advantage of my system is the larger output or welding current obtainable from a given equipment by the presaturation of the transforming means 8.

Referring particularly to the improvement in efficiency obtained by virtue of the operation of the electric valve means 18, instead of dissipating the stored electromagnetic energy or transferring it back to the supply circuit 2, the electric valve means 18 effectively causes the complete transfer of the energy to the welding circuit 1. In addition, the electric valve means 18 terminates the period of conduction by electric valve means 3 so that it does not conduct current for an appreciable time into that region which would effect the transmission of the stored electromagnetic energy back to the supply circuit 2.

The wave shape of the current supplied to the welding circuit 1 may be more fully appreciated by referring to the operating characteristics shown in Fig. 2. Curve A represents the voltage of the supply circuit 2. Curve BCD represents the wave form of the current which would be transmitted to the welding circuit 1 without employing the electric valve means 18; and curve BCE represents the wave form of the current transmitted to the welding circuit 1 when the electric valve means 18 is employed. It will be noted that the region CE of this latter curve represents the exponential decay of current in the welding circuit 1 due to the conduction of current by electric valve means 18. Furthermore it should be noted that the duration of the current curve, as established by the time interval between points C and E, is substantially greater than one cycle of voltage of the supply circuit and may have a duration of one and one-half or two cycles of voltage of the supply circuit 2.

If the control or timing circuit connected to the relay 38 effects intermittent operation of the relay, it will be appreciated that the welding circuit 1 will be energized intermittently or periodically. Due to the nature of the control circuit 29, the electric valve 11 and the electric discharge device 25 will be maintained nonconducting for predetermined intervals of time after each energization of the relay 38, thereby assuring the full advantages of the system including the presaturation feature. In such event, it will be appreciated that the relay 38 should be operated so that the time between succeeding energizations or operations thereof is somewhat greater than the hold-off periods for the electric discharge device 25 and electric valve 11.

The magnitude of the current transmitted to welding circuit 1 may be controlled or adjusted by means of the phase shifting device connected between the supply circuit 2 and the peaking transformer 36. This adjustment controls the phase of the time of occurrence of the impulse of peaked voltage impressed on grid 26 of discharge device 25 and, hence, controls the time during a positive half cycle of applied anode-cathode voltage at which electric valve means 3 is rendered conducting. In this manner the magnitude of the current and the heating effect of the welding current are controllable or adjustable.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, transforming means having a magnetic core member, primary winding means and secondary winding means connected to said load circuit, normally nonconducting electric valve means connected between said supply circuit and said primary winding means, normally conducting second electric valve means poled in opposition to the first mentioned electric valve means and connected between said supply circuit and said primary winding means for transmitting current through said primary winding means in a direction opposite to that effected by said first mentioned electric valve means and at times immediately preceding the interval of conduction by said first mentioned electric valve means and for controlling the current to presaturate said transforming means, means for rendering the first mentioned electric valve means conducting and for rendering said second electric valve means nonconducting thereby effecting the transmission of an impulse of current to said load circuit, and electric valve means connected to said primary winding means and poled to provide a path for the flow of current incident to the electromagnetic energy stored in said transforming means occasioned by conduction of said first mentioned electric valve means thereby permitting the current transmitted to said load circuit to decay exponentially.

2. In combination, an alternating current supply circuit, a load circuit, transforming means having a magnetic core member, primary winding means and secondary winding means connected to said load circuit, electric valve means connected between said supply circuit and said primary winding means, control means for said electric valve means, a second electric valve means poled in opposition to the first mentioned electric valve means, control means for controlling said second electric valve means to transmit current through said primary winding means in a direction opposite to that effected by said first mentioned electric valve means and at times immediately preceding the interval of conduction by said first mentioned electric valve means and for controlling the current transmitted by said second electric valve means to pre-saturate said transforming means and for controlling the wave form of the current supplied to said load circuit, and electric valve means connected to said primary winding means for providing a path for the flow of current due to the electromagnetic energy stored in said transforming means occasioned by conduction of said first mentioned electric valve means.

3. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for pre-saturating said magnetic core member in a direction opposite to the magnetization effected by the flow of current through said electric valve means, means for rendering said electric valve means conducting and for transmitting current to said primary winding means from said alternating current circuit, and unidirectional conducting means connected to said primary winding means for providing a path for the flow of current incident to the electromagnetic energy stored in said transforming means occasioned by the conduction of current by said electric valve means and for causing the decay of current exponentially in said load circuit.

4. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for premagnetizing said magnetic core member to a point of saturation and in a direction opposite to the magnetization effected by the flow of current through said electric valve means, means for rendering said electric valve means conducting and for transmitting current to said primary winding means from said alternating current circuit, and unidirectional conducting means connected to said primary winding means for preventing the transfer of stored electromagnetic energy of said transforming means incident to the flow of current through said primary winding means to said supply circuit.

5. In combination, an alternating current supply circuit, a load circuit, transforming means having a magnetic core member, primary winding means and secondary winding means connected to said load circuit, normally non-conducting electric valve means connected between said supply circuit and said primary winding means and being of the type employing an ionizable medium capable of supporting an arc discharge, means for pre-saturating said magnetic core member in a direction opposite to the magnetization effected by the flow of current through said electric valve means, means for rendering said electric valve means conducting and for transmitting current to said primary winding means from said alternating current circuit, and unidirectional conducting means connected to said primary winding means to extend the duration of the impulse of current transmitted to said load circuit.

6. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for pre-saturating said magnetic core member and in a direction opposite to the magnetization effected by the flow of current through said electric valve means, means for rendering said electric valve means conducting and for transmitting current to said primary winding means from said alternating current circuit, and unidirectional conducting means connected to said primary winding means to prevent the inductance of said transforming means from extending the time of conduction of the electric valve means into the region where appreciable stored electromagnetic energy will be transferred from said transforming means to said supply circuit.

7. In combination, an alternating current supply circuit, a load circuit, transforming means having a magnetic core member, primary winding means and secondary winding means connected to said load circuit, normally non-conducting electric valve means connected between said supply circuit and said primary winding means and being of the type employing an ionizable medium capable of supporting an arc discharge, means for rendering said electric valve means conducting and for transmitting current to said primary winding means from said alternating current circuit, and unidirectional conducting means connected to said transforming means to prevent the inductance thereof from extending the time of conduction of the electric valve means into the region where appreciable stored electromagnetic energy will be transferred from said transforming means to said supply circuit.

8. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for rendering said electric valve means conducting and for transmitting current to said primary winding means from said alternating current circuit, and unidirectional conducting means connected to said transforming means to extend the duration of the impulse of current transmitted to said load circuit.

9. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for rendering said electric valve means conducting and for transmitting current to said primary winding means from said alternating current circuit, and electric valve means connected to said primary winding means and responsive to the voltage thereof for providing a path for the flow of current incident to the electromagnetic energy stored in said transforming means occasioned by the conduction of current by the first mentioned electric valve means and for causing the decay of current exponentially in said load circuit.

10. In combination, an alternating current supply circuit, a load circuit, transforming means having a magnetic core member, primary winding means and secondary winding means connected to said load circuit, normally nonconducting electric valve means connected between said supply circuit and said primary winding means and being of the type employing an ionizable medium capable of supporting an arc discharge, means for premagnetizing said magnetic core member in a direction opposite to the magnetization effected by the flow of current through said electric valve means, means for rendering said electric valve means conducting and for transmitting current to said primary winding means from said alternating current supply circuit, unidirectional conducting means connected to said transforming means to extend the duration of the impulse of current transmitted to said load circuit, and means for preventing conduction by said unidirectional means when the premagnetizing means is operating.

11. In combination, an alternating current supply circuit, a load circuit, transforming means having a magnetic core member, primary winding means and secondary winding means connected to said load circuit, normally nonconducting electric valve means connected between said supply circuit and said primary winding means and being of the type capable of supporting an arc discharge, a premagnetizing circuit for said transforming means for establishing a unidirectional magnetization having a direction opposite to that effected by the flow of current through said electric valve means, control means for rendering said electric valve means conducting and for transmitting current to said primary winding means from said alternating current supply circuit, electric valve means connected to said primary winding means to extend the duration of the impulse of current transmitted to said load circuit, and means responsive to said control means for controlling the conductivity of said last mentioned electric valve means.

12. In combination, an alternating current supply circuit, a load circuit, transforming means having a magnetic core member, primary winding means and secondary winding means connected to said load circuit, normally nonconducting electric valve means connected between said supply circuit and said primary winding means and being of the type capable of supporting an arc discharge, a premagnetizing circuit for said transforming means for establishing a unidirectional magnetization having a direction opposite to that effected by the flow of current through said electric valve means, control means for rendering said electric valve means conducting and for transmitting current to said primary winding means from said alternating current supply circuit, electric valve means connected to said primary winding means to extend the duration of the impulse of current transmitted to said load circuit, and means for preventing conduction by said last mentioned electric valve means during the intervals of time within which the premagnetizing means is operating.

GEORGE W. GARMAN.

DISCLAIMER 2,325,390.—*George W. Garman*, Glenville, N. Y. Electric Valve Translating System. Patent dated July 27, 1943. Disclaimer filed June 7, 1946, by the assignee, *General Electric Company*.

Hereby enters this disclaimer to claims 1, 2, 3, 4, 5, 6, 7, 8, 9, and 11 of said patent.

[*Official Gazette July 16, 1946.*]